United States Patent
Southern et al.

(10) Patent No.: US 9,852,033 B2
(45) Date of Patent: Dec. 26, 2017

(54) METHOD OF RECOVERING APPLICATION DATA FROM A MEMORY OF A FAILED NODE

(71) Applicant: FUJITSU LIMITED, Kawasaki-shi, Kanagawa (JP)

(72) Inventors: James Alastair Southern, Reading (GB); Nicholas Wilson, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/534,383

(22) Filed: Nov. 6, 2014

(65) Prior Publication Data
US 2015/0309893 A1    Oct. 29, 2015

(30) Foreign Application Priority Data
Apr. 25, 2014  (EP) .................................... 14165974

(51) Int. Cl.
*G06F 11/16*    (2006.01)
*G06F 11/20*    (2006.01)

(52) U.S. Cl.
CPC ........ *G06F 11/1658* (2013.01); *G06F 11/203* (2013.01); *G06F 11/2025* (2013.01); *G06F 11/2028* (2013.01)

(58) Field of Classification Search
CPC ............... G06F 11/1658; G06F 11/203; G06F 11/2023; G06F 11/2025; G06F 11/2028
See application file for complete search history.

(56) References Cited

U.S. PATENT DOCUMENTS

| 5,632,013 | A |   | 5/1997 | Kyrgowski et al. |
| 5,724,501 | A | * | 3/1998 | Dewey ................ G06F 12/0866 711/E12.019 |
| 5,887,270 | A |   | 3/1999 | Brant et al. |
| 6,360,331 | B2 | * | 3/2002 | Vert .................... G06F 11/1662 709/239 |
| 6,675,316 | B1 |   | 1/2004 | Harper |
| 7,028,154 | B2 | * | 4/2006 | Reeves ............... G06F 11/1441 711/161 |
| 7,536,506 | B2 | * | 5/2009 | Ashmore .............. G06F 1/3203 711/114 |

(Continued)

FOREIGN PATENT DOCUMENTS

WO    WO 2007/021709 A1    2/2007

OTHER PUBLICATIONS

Extended European Search Report dated Sep. 9, 2014, in corresponding European Patent Application No. 14165974.8.

*Primary Examiner* — Matt Kim
*Assistant Examiner* — Paul Contino
(74) *Attorney, Agent, or Firm* — Staas & Halsey LLP (57) ABSTRACT

A method of recovering application data from the memory of a failed node in a computer system comprising a plurality of nodes connected by an interconnect and of writing the application data to a replacement node; wherein a node of the computer system executes an application which creates application data storing the most recent state of the application in a node memory; the node fails; the node memory of the failed node is then controlled using a failover memory controller; and the failover memory controller copies the application data from the node memory of the failed node to a node memory of the replacement node over the interconnect.

15 Claims, 6 Drawing Sheets

(56) References Cited

U.S. PATENT DOCUMENTS

| | | |
|---|---|---|
| 8,099,627 B1 | 1/2012 | Shah et al. |
| 9,336,103 B1* | 5/2016 | Hasbe ................. G06F 11/2023 |
| 2003/0182593 A1* | 9/2003 | Emberty .................. H04L 1/22 |
| | | 714/5.11 |
| 2004/0255181 A1 | 12/2004 | Hsu et al. |
| 2005/0039090 A1* | 2/2005 | Jadon .................. G06F 11/2046 |
| | | 714/718 |
| 2005/0097394 A1* | 5/2005 | Wang ................. G06F 11/2025 |
| | | 714/11 |
| 2006/0106990 A1* | 5/2006 | Benhase ............. G06F 12/0804 |
| | | 711/135 |
| 2008/0109570 A1 | 5/2008 | Leonard et al. |
| 2011/0022882 A1 | 1/2011 | Jaehde et al. |
| 2011/0252272 A1 | 10/2011 | Goodwin et al. |
| 2011/0271069 A1* | 11/2011 | Manmohan ......... G06F 11/2028 |
| | | 711/163 |
| 2012/0144235 A1* | 6/2012 | Bodke ................... G06F 11/203 |
| | | 714/19 |

\* cited by examiner

METHOD OF RECOVERING APPLICATION DATA FROM A MEMORY OF A FAILED NODE

CROSS REFERENCE TO RELATED APPLICATIONS

This application claims the benefit of European Application No. 14165974.8, filed Apr. 25, 2014, the disclosure of which is incorporated herein by reference.

BACKGROUND OF THE INVENTION

1. Field of the Invention

The present invention relates to the recovery of data from a failed computational node, particularly but not exclusively in a parallel computing environment and in high performance computing (HPC) applications. The present invention finds application particularly in the field of fault-resilient distributed computing, with emphasis on exascale computers. Computationally intense and other large-scale applications are usually carried out on HPC systems. Such HPC systems often provide distributed environments in which there is a plurality of processing units or "cores" on which independent sequences of events such as processing threads or processes of an executable can run autonomously in parallel.

2. Description of the Related Art

Many different hardware configurations and programming models are applicable to HPC. A popular approach to HPC currently is the cluster system, in which a plurality of nodes, each having one or more multicore processors (or "chips"), are interconnected by a high-speed network. Each node is assumed to have its own area of memory, which is accessible to all cores within that node. The cluster system can be programmed by a human programmer who writes source code, making use of existing code libraries to carry out generic functions, such as hardware control. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (O/S) and uses the O/S and libraries to control hardware. The different layers of software used may be referred to together as a software stack.

The term "software stack" as used herein includes all the software required to run an application, including the base level software (the operating system or O/S); libraries interfacing, for example, with hardware components such as an interconnect between nodes, a disc or other memory etc (also a type of system software) and the application itself. The application currently executing may be seen as the top layer of the software stack, above the system software.

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores. A (multi-threaded) process may run across several cores within a multi-core CPU and each node may contain one or more CPUs. One such library is the Message Passing Interface, MPI, which uses a distributed-memory model (each process being assumed to have its own area of memory), and facilitates communication among the processes. MPI allows groups of processes to be defined and distinguished, and includes routines for so-called "barrier synchronization", which is an important feature for allowing multiple processes or processing elements to work together.

Alternatively, in shared-memory parallel programming, all processes or cores can access the same memory or area of memory. In a shared-memory model there is no need to explicitly specify the communication of data between processes (as any changes made by one process are transparent to all others). However, it may be necessary to use a library to control access to the shared memory to ensure that only one process at a time modifies the data.

Exascale computers (i.e. HPC systems capable of 1 exaflop ($10^{18}$ floating point operations per second) of sustained performance) are expected to be deployed by 2020. Several national projects to develop exascale systems in this timeframe have been announced. The transition from petascale (current state-of-the-art, approximately $10^{15}$ flops) to exascale is expected to require disruptive changes in hardware technology. There will be no further increase in processor clock frequency, so the improved performance will result from an increase in parallelism or concurrency (possibly up to approximately 1 billion cores). The requirement to keep the power usage of an exascale system within an acceptable window means that low-power (and low-cost) components are likely to be used, resulting in a reduced mean-time-to-failure for each component. Thus, an exascale system will contain many more components than today's state-of-the-art systems—and each component is likely to fail more frequently than its equivalent today. It is likely that the mean-time-to-component-failure for an exascale system will be measured in minutes (as opposed to days for current systems).

Therefore, exascale software in particular will require increased resilience to these faults and will need to be able to continue to run through component failure. Since HPC applications are generally carefully load balanced to ensure that work is distributed across all of the available computational cores, it can be important that a replacement node be made available to the application to carry out the work allocated to the failed node (assigning this work to one or more of the remaining nodes which is already loaded is likely to disrupt the load balance and lead to a significant performance degradation).

Figure 1:
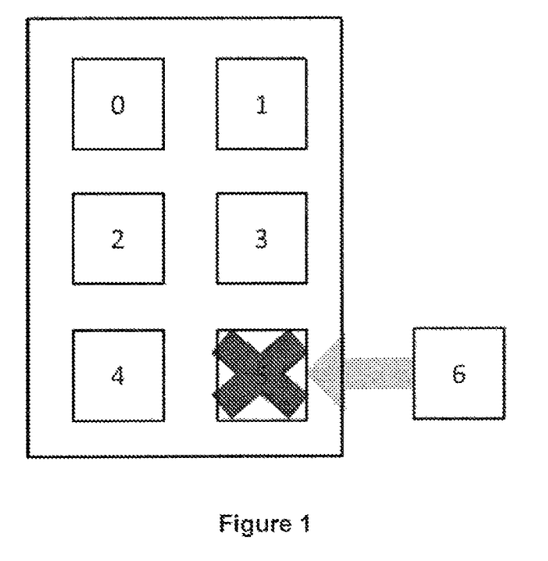
FIG. 1 (described above) is a schematic diagram showing replacement of a failed node.

FIG. 1 illustrates the process of replacing the failed node with a replacement node. The diagram shows six nodes in a system (nodes 0-5), with node 5 failing and no longer being able to contribute to running the application. Of course in reality many more nodes make up a computer system. A replacement node (node 6) is made available to the system and is inserted to replace the failed node. Once the replacement node has been assigned to the application, it is also necessary to initialize it with the data required in order to continue execution (e.g. the values of variables computed by the application).

The need to initialize a replacement node is not new and known initialisation techniques include:

Restarting the node from a checkpoint file: This method guarantees that the data is initialised to the correct values. However, generating a checkpoint is time consuming (since it involves copying large amounts of data either to the memory on another node or to a file on disk). Hence, data is generally checkpointed periodically with relatively large gaps between checkpoints.

Thus, when recovering data from a checkpoint, all computation since the last checkpoint needs to be repeated (at least on the failed node and possibly globally). Thus, there is a two-fold overhead in time from checkpointing; once when creating the checkpoint and once again when reading and re-computing to recover from it.

Interpolating values on the failed node from those of the equivalent data on the surviving nodes: This method is not always possible (e.g. if each node is responsible for a discrete region of space in a modelling algorithm then it is unlikely to be possible to interpolate the solution across the whole of this region simply from the values on its boundary). Even if it is possible to interpolate the data on the failed node from that on other nodes, there will be a loss of accuracy as a result of doing this.

Both of these prior art techniques have deficiencies and thus it is desirable to provide an alternative way of initialising a replacement node.

SUMMARY OF THE INVENTION

According to embodiments of one aspect of the invention there is provided a method of recovering application data from the memory of a failed node in a computer system comprising a plurality of nodes connected by an interconnect and of writing the application data to a replacement node; wherein a node of the computer system executes an application which creates application data storing the most recent state of the application in a node memory; the node fails; the node memory of the failed node is then controlled using a failover memory controller; and the failover memory controller copies the application data from the node memory of the failed node to a node memory of the replacement node over the interconnect.

The inventors have come to the realisation that what is required is a method to obtain the actual data on the failed node (not interpolated with a loss of accuracy), preferably from the state immediately before the fault (not some time previously), without the need to repeatedly copy the data off the node (as this is time consuming and, most of the time, unnecessary).

Invention embodiments propose a method to recover the data directly from the memory of the failed node in order to overcome limitations with the current state-of-the-art.

Thus, according to invention embodiments, there is a plurality of nodes and if one node fails it is replaced with a replacement node. The failover memory controller (effectively a standby memory controller which is used when a node fails) then takes control of the node memory of the failed node and copies the application data from the node memory of the failed node to the node memory of the replacement node. The method is therefore able to recover the application data, which is the most recent state of the application and can include the entire contents of node memory being used by the application, from the failed node and copy it to the replacement node, which may be a node not previously used in execution of the application. The replacement node may be a node held in reserve for the event that there is failure of a node executing the application. It may be treated the same as the other nodes after it is initialised.

In parallel execution of an algorithm in a system comprising multiple nodes, the application data can include, for example, the latest version of the portion of the algorithm calculated on the node.

Not all of the node memory may be available for the application data. The node memory may also be used by other processes, such as, for example, operating system processes. Certain portions of the node memory may also be reserved for other uses and therefore unavailable to the application data. In such circumstances the application may register a portion of node memory, preferably to the failover memory controller. This registration may be of the currently executing node and hence allow copying of the correct section of failed node memory only. Additionally or alternatively, this registration may be of the replacement node and make sure that the data is copied into an available section of the replacement node. Registration can happen at any time when the application is running but happens before the node failure. In preferred embodiments, registration takes place as soon as possible after the application is allocated memory within the node.

The portion of node memory registered can either be the portion of memory that is available for use by the application or the portion of memory that is unavailable (these are equivalents, so either option will allow a determination of the correct section of the failed node and/or available replacement section). The portion of node memory can be a portion of the node memory of the failed node, the replacement node or both the failed and replacement nodes. In situations where not all of the node memory is available to the application data on both or either of the nodes, this embodiment can ensure that only the application data of the failed node is copied to the replacement node and/or that it is copied to an available portion of the node memory of the replacement node. The registration is preferably on a per-node basis, rather than as a pattern for all the nodes used in the application, so that each node can decide internally how memory is allocated to the application.

In preferred invention embodiments, the failed node is likely to be completely non-functional. This may be because of an electrical failure in the node itself, or in the communication fabric connecting the node to the rest of the system, or due to some other fault. The power connection to the memory may not be unavailable (e.g. an interconnect or memory controller failure may leave the power supply to the memory intact, but the contents inaccessible), but it is a strong possibility that the power will be lost in many node-failure scenarios.

According to some invention embodiments, node failure may thus mean that there is no longer a power supply to the node, and in particular that there is no longer a power supply to the node memory. In such circumstances it may be appropriate to provide an auxiliary power supply that is independent from the rest of the system. The auxiliary power can supply power to any part or all of the system, but preferably supplies the node memory of the failed node. Preferably the auxiliary power is switched on automatically when there is a node failure. It can act to maintain power to the memory continuously so that the memory will not be wiped by a power failure. The auxiliary power supply may be controlled by any suitable means but preferably it is controlled by the failover memory controller.

The auxiliary power supply of invention embodiments may be any sort of suitable power supply but is preferably a battery (one or more electric cells). The auxiliary power supply may be provided anywhere in the system, but is preferably with the failover memory controller (whether associated with a node or provided separately). If there is a plurality of failover memory controllers, invention embodiments may provide the same number of auxiliary power supplies, each linked to its own failover memory controller or may provide fewer auxiliary power supplies, each linked to a number of failover memory controllers.

The auxiliary power supply may be capable of supplying power to the failover memory controller at any time. This may be before or after the failure of a node, preferably both. When the auxiliary power supply powers the failover memory controller, it is also preferable that it powers the failover memory controller's interconnect connection and any other such interconnect connection that may require power.

In invention embodiments, the auxiliary power may be supplied to the node memory of a node either directly or via another component of the node, such as a processor or node memory controller. Preferably, the auxiliary power is supplied directly to the node memory of the failed node.

Connection of the failover memory controller to the interconnect of a node may be either direct or via another component, such as a processor or node memory controller of the failed node. Preferably the failover memory controller is directly joined to the interconnect.

The computer system may have a (central) management process (for example at operating system level) which monitors the nodes. In such circumstances it is preferable that the management process is capable of detecting the node failure, identifying the replacement node and instructing the failover memory controller to copy the application data from the node memory of the failed node to the node memory of the replacement node. It is also preferable for the management process to restart the application on the replacement node.

In invention embodiments, the system may have one auxiliary power supply or a plurality of auxiliary power supplies. Depending on the number of nodes in the system and the number of auxiliary power supplies, each auxiliary power supply may either be provided for a single node or for a group of nodes.

Similarly, the system may have one failover memory controller or a plurality of failover memory controllers. Depending on the number of nodes in the system and the number of failover memory controllers, each failover memory controller may either be provided for a single node or for a group of nodes.

According to embodiments of another aspect of the invention there is provided a failover memory controller for use in recovery from a failed node when running an application on a computer system comprising a plurality of nodes, each with its own node memory and node memory controller, the nodes being connected by an interconnect, wherein the failover memory controller is operable to connect to the memory controller and/or memory of the failed node; and wherein the failover memory controller is arranged to control transfer of application data stored in the node memory of the failed node over the interconnect to the node memory of a replacement node.

This aspect relates to the failover memory controller, which may be provided as part of the computer system. As outlined above, there may be a plurality of failover memory controllers, perhaps one per node. In invention embodiments, the (or each) failover memory controller may be autonomous with respect to some or all of the nodes in the computer system, preferably all of the nodes, including the failed node. However the failover memory controller can have the ability to control parts of the node when required.

According to embodiments of another aspect of the invention there is provided a computer system comprising: a plurality of nodes, each with its own node memory and node memory controller; a failover memory controller for use in recovery from a failed node when running an application on the nodes; and an interconnect connecting the nodes and the failover memory controller, wherein the failover memory controller is operable to connect to the memory controller and/or memory of a failed node; and wherein the failover memory controller is arranged to control transfer of application data stored in the node memory of the failed node over the interconnect to the node memory of a replacement node.

The failover memory controller is preferably connected directly to the memory of the failed node and also to the memory controller of the failed node, for example to ensure that the node memory controller leaves the node memory in a consistent state (if possible—as it is conceivable that the node memory controller has suffered the failure) and then yields control to the failover controller.

The computer system may be an HPC system, or any other computer system with a distributed memory and nodes connected by an interconnect.

According to computer system embodiments, the failover memory controller may have a power connection and interconnect connection that is either separate or not separate from node power and interconnect connections. Preferably, the failover memory controller has a power connection and/or interconnect connection which is separate from node power and interconnect connections. This allows more autonomy of the failover memory controller. In preferred invention embodiments, the power supply to the failover memory controller (which may be, but is not necessarily the auxiliary power supply) is independent of the operational state of all the nodes, so that it does not rely on any particular node being still operational to supply power onwards. In most cases, the failover memory controller may ultimately use the same power supply as the rest of the computer system: invention embodiments are not specifically designed to be used in a situation in which the entire system loses power.

According to embodiments of another aspect of the invention there is provided a daemon (a computer program run as a background process, rather than under user control) running on a computer system comprising a failover memory controller, and a plurality of nodes each including node memory, the nodes and failover memory controller all connected by an interconnect; wherein the daemon monitors the execution of an application on the nodes, the daemon detects a node failure, identifies a replacement node and instructs the failover memory controller to copy application data across the interconnect from the node memory of the failed node to the node memory of the replacement node.

Effectively, the daemon can provide the management process mentioned earlier. Thus it may run automatically as part of the operating system.

According to a further general program aspect, there is provided a program which when loaded onto a computing apparatus such as a distributed computer system configures the computing apparatus to carry out the method steps according to any of the preceding method definitions or any combination thereof.

Features and sub features of any of the different aspects of the invention may be freely combined. For example, preferred embodiments of the failover memory controller and/or computer system may be configured to incorporate functionality corresponding to one or more preferred features of the method.

The invention can be implemented in computer hardware, firmware, software, or in combinations of them. Embodiments can be implemented as a computer program or computer program product, i.e., a computer program tangibly embodied in an information carrier, e.g., in a non-transitory machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a library, stand-alone program or as a module, component, subroutine, or other unit suitable for use in a data processing environment.

Method steps of the invention can be performed by programmable processors executing a computer program to perform functions of the invention by operating on input data and generating output.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

The invention will now be described with reference to specific non-limiting embodiments as shown in the drawings, in which.

DETAILED DESCRIPTION OF THE PREFERRED EMBODIMENTS

Figure 2:
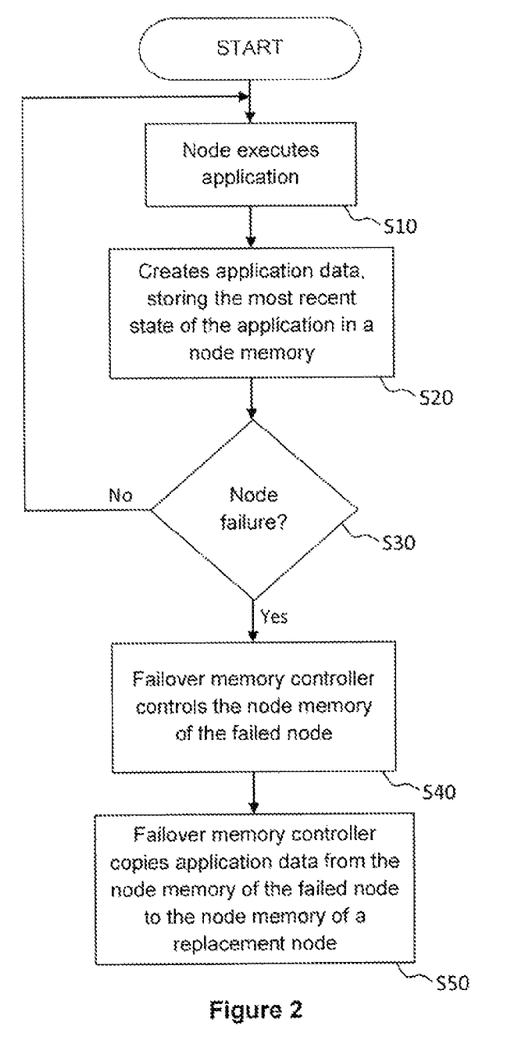
FIG. 2 is a flowchart depicting a general embodiment of the invention.

FIG. 2 is a flowchart representing a general invention embodiment. In step S10, a computational node executes an application. In step S20 application data is created and the most recent state of the application is stored in node memory. If the node fails in step S30, the failover memory controller controls the node memory of the failed node in step S40. Finally, the failover memory controller copies across data from the memory of the failed node to the memory of the replacement node, step S50.

Since the failover memory controller is only used following a fault, the application data is recovered from the failed node without carrying out redundant tasks, such as data storage. Hence nodes need store only a single copy of application data. Thus the method is a reactive one. Moreover a single failover memory controller can interact with memory on multiple nodes if required. Invention embodiments can respond to an unanticipated fault in an application executing in parallel by copying the entire application data from one node to another node.

The method proposed in invention embodiments involves the addition of a failover memory controller to the computer system. This part can duplicate the function of the memory controllers within one or more nodes, or each node. It may be attached to an auxiliary/back-up power source which supplies power to the failover memory controller and maintains power to the memory of the failed node in order to allow for the data within the memory to be recovered and then transferred to the replacement node. A failure management process of the nodes may be provided. For example, following a failure on one node, a management process detects the failure, identifies a replacement node and directs the failover memory controller to connect to the memory of the failed node and copy its contents directly to the memory of the replacement node. This reduces the time required to re-initialize an application following a fault (compared to standard checkpointing) and also minimizes the amount of computation that must be repeated (a small amount may still need to be repeated as data in the processor registers is not recovered).

There are two main ways in which the replacement node can be allocated. Firstly, the application can be launched with more nodes allocated to it than it actually needs (possibly an extra 10% of "spare" nodes). Then, if a failure is detected on one of the nodes running the application (either by the application itself or through some monitoring software framework, e.g. the management process), the spare node has been reserved and is waiting.

Alternatively (and possibly preferentially), a system job scheduler can hold a pool of spare nodes that can be allocated to any running application. Then, following detection of a node failure, the application (or the monitoring framework) would contact the job scheduler and request access to one of the spare nodes. In this scenario the job scheduler is responsible for ensuring that as new jobs begin running a sufficiently large pool of spare nodes remains available.

Figure 3:
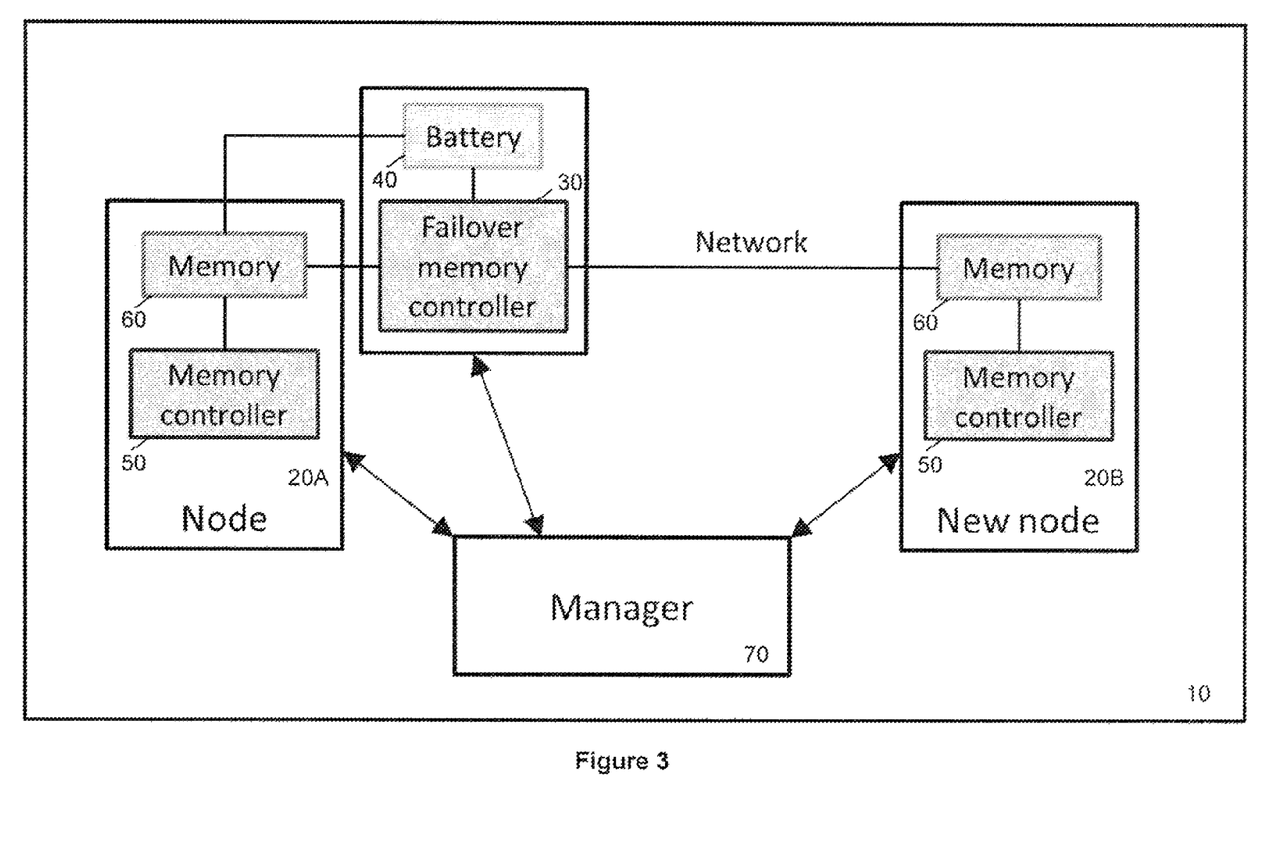
FIG. 3 is an overview of a recovery method according to invention embodiments.

FIG. 3 illustrates a particular embodiment of a method for recovery from a dead node. FIG. 3 illustrates two of many nodes 20 in the computer system 10. The failed (or dead node) is shown to the left as node 20A and the new/replacement node is shown to the right as node 20B. Each node includes memory 60 and memory controller 50. Other node parts are known to the skilled person and not illustrated. A battery 40 and a failover memory controller 30 are provided separately from both nodes, perhaps on the same physical support. The battery is shown linked to the memory of the failed node 20A and to the failover memory controller 30. There is no need for the battery 40 to be linked to the memory 60 of the replacement node 20B, because that node is still connected to a power supply. The failover memory controller 30 is also linked over the network/interconnect to the memory 60 of replacement node 20B.

Hence, the failover memory controller and battery are additional parts in the computer system. In the event of a node failure, the battery supplies power to the memory on the failed node and the failover memory controller (also powered by the battery) recovers the contents of that memory and transfers them to the new node intended to replace the failed one. A manager 70 controls this process (identifying failed nodes, directing the failover memory controller to them and specifying where the memory should be copied to).

Figure 4A:
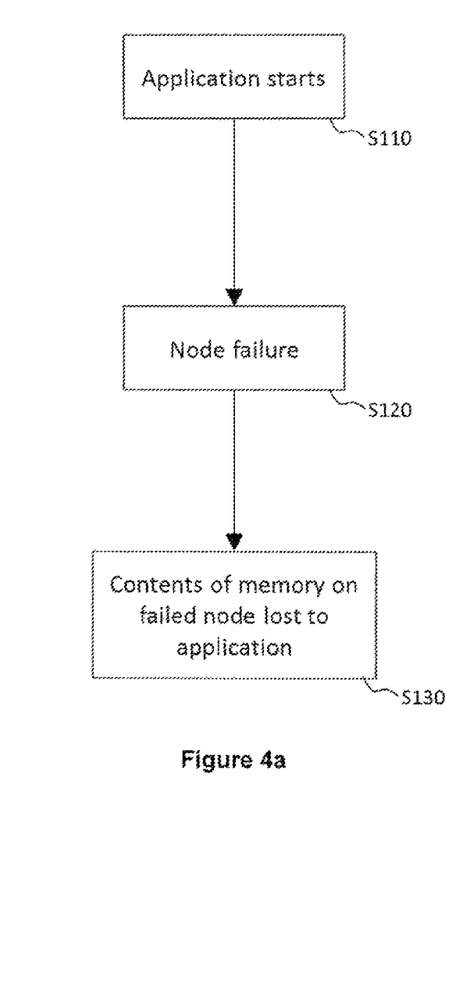
FIG. 4a is flow chart of prior art node failure recovery.
Figure 4B:
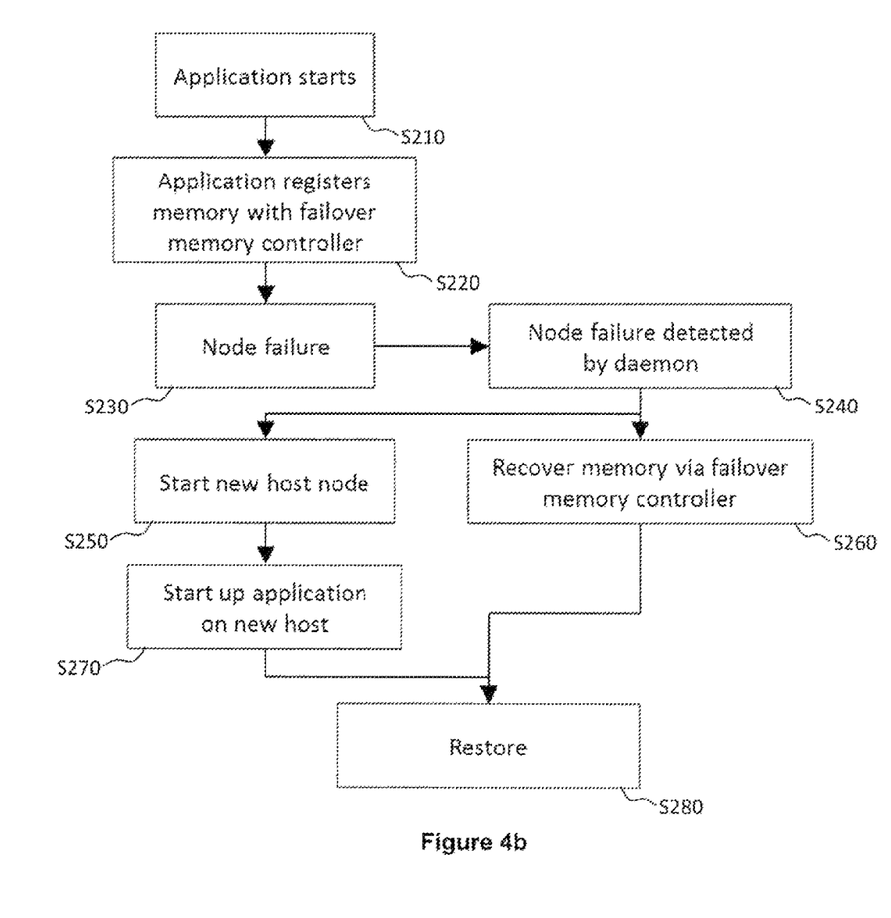
FIG. 4b is a flow chart of failed node recovery according to invention embodiments.

FIGS. 4*a* and 4*b* are flow charts showing a failed node in the prior art with no recovery and recovery of a node using the failover memory controller of an invention embodiment to transfer contents of memory to the new host node.

If no recovery is provided, as in FIG. 4*a*, the application starts in step S110, there is node failure in step S120 and the contents of the memory on the failed node are lost to the application in step S130.

In FIG. 4*b*, a failover memory controller is used to recover data. Immediately after starting in step S210, it is necessary for the application to register which parts of the node memory it is using in step S220 (or, equivalently, which parts are reserved for other uses and not available to it). This is because some parts of the total memory on the CPU are used by other processes, e.g. the operating system (O/S). Equivalent processes are likely to be running on the replacement node and it will not be desirable to overwrite the memory that they are using (this is likely to cause problems on the new node, possibly even causing it to fail). Thus, only the memory that is being directly used by the application should be transferred following a failure and, hence, this must be registered at an early stage.

Following this registration, the application continues to run until there is a node failure, S230. Meanwhile, the manager daemon monitors the health of each node (daemons to do this already exist, and further description is omitted here). Following detection of a failure in step S240, the manager allocates a new host node to the application in step S250 (to replace the failed one), begins the process of starting up the application on that node, S270 and notifies the failover memory controller, S260. The notification can be in parallel with the other operations. Meanwhile, the application can continue on the remaining nodes (although it is likely that execution will eventually be held at a synchronization point awaiting data from the failed node). In a restore step S280, power is maintained to the memory of the failed node by an auxiliary power supply and the failover memory controller copies the data from the sections of memory previously registered and then transfers them directly to the memory on the replacement node (including notification of the memory controller on the new node). Once the memory has been successfully copied to the replacement node, the management daemon can restart execution on this node.

The failover controller can be responsible for one or more nodes. The above process requires the failover memory controller to be connected directly to the memory and memory controllers on each node that it is responsible for and also to have access to the network. The battery needs to be connected to the memory on the node (but not necessarily to the memory controller) and may also power the failover memory controller's network connection.

Figure 5:
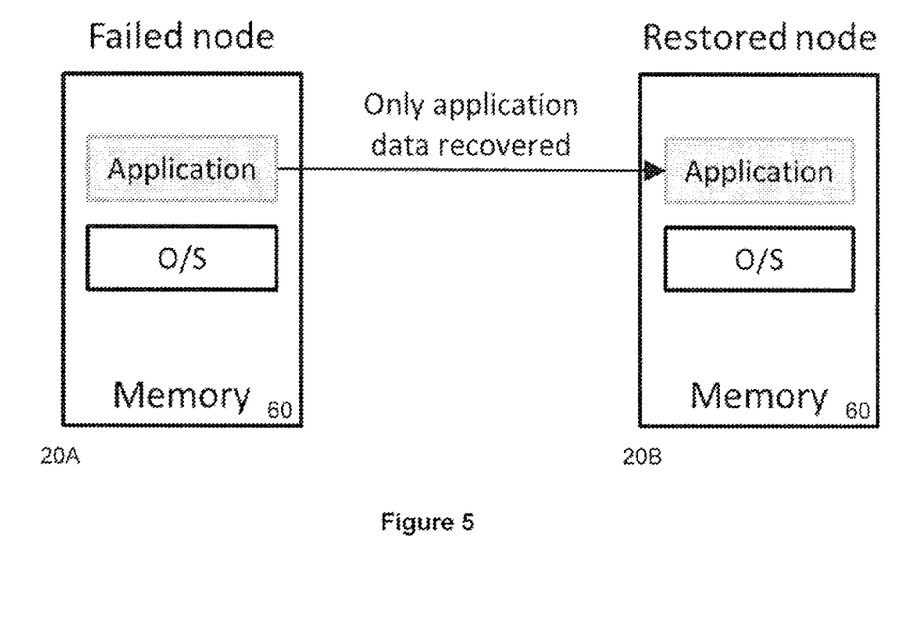
FIG. 5 is a schematic diagram illustrating movement of data to the replacement node according to invention embodiments.

FIG. 5 show movement of data from memory 60 on a failed node 20A to memory 60 on a replacement node 20B. Only application data is recovered (as the replacement node has its own instance of other data, e.g. O/S). This arrangement requires the application to register the memory used by the application with the failover memory controller on start-up, unless there is another methodology or set parts of the memory available to the application.

The failover memory controller could be implemented either as a one-for-one addition to each node (possibly on the same circuit board, but acting autonomously, including its own network connection and power supply) or as (one or more) separate components within the system, each responsible for recovering the memory of a group of processors (possibly for the whole system). Invention embodiments function equally well with any of these possibilities.

Figure 6:
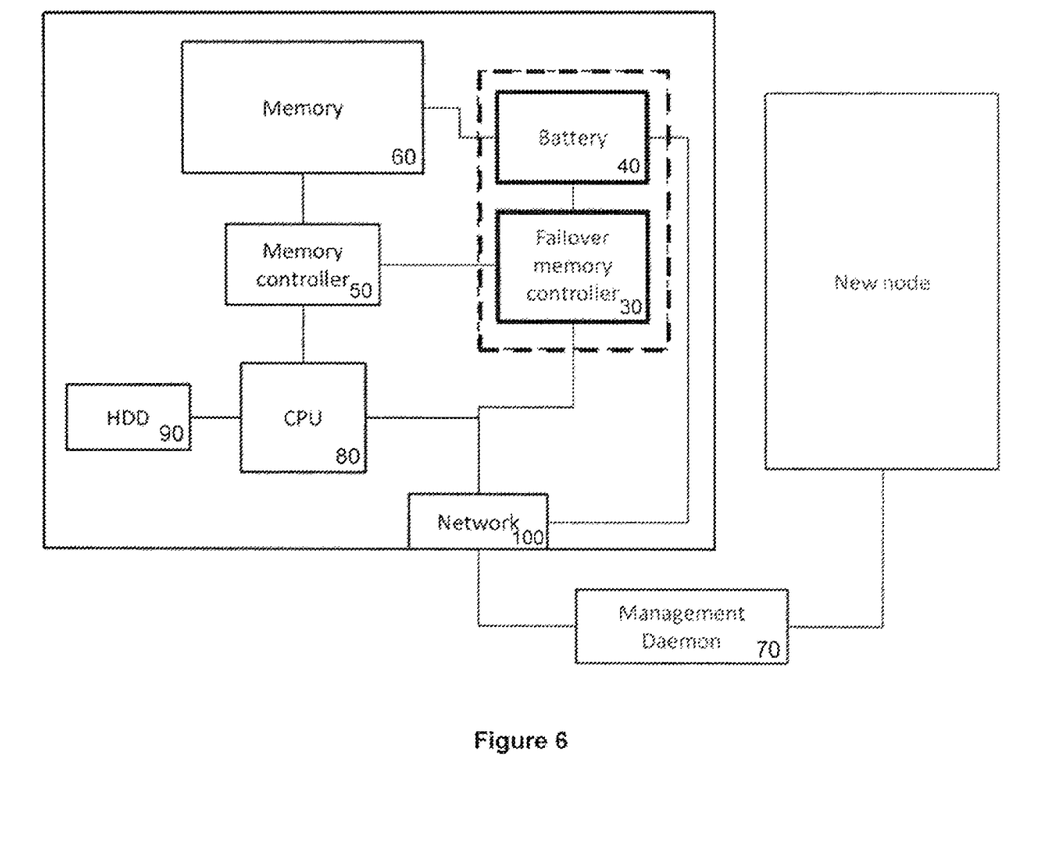
FIG. 6 is a schematic layout of components in a node and links off the node according to invention embodiments.

FIG. 6 depicts the physical relationship between components of the system (differences with respect to the prior art are shown in bold). The diagram shows a failed node, a management daemon and a new node.

The failed (or old) node comprises a memory controller 50, a memory 60, a CPU 80 and a hard disk drive (HDD) 90, with external connections via a network connector 100. It also includes a failover memory controller 30 and a battery 40. The failover memory controller 30 is connected directly to the memory controller 50 and the battery 40 is connected directly to the memory 60 and the failover memory controller 30. The network connection 100 allows connection of the CPU 80 and failover memory controller 30 to a management daemon 70.

Although the battery and failover memory controller within the bold lines are shown as being located within the old node, this may not be the case. The failover memory controller and battery could alternatively be housed elsewhere in the system (as long as they are connected to the network and can bypass the CPU and memory controller to access the node's memory) and one failover memory controller may be responsible for memory on more than one node.

Invention embodiments may have some or all of the following advantages:

Very significant reduction in the amount of computation that needs to be repeated following failure of a node, since the most recent possible state of the application is recovered (rather than a version from some distance in the past if a standard checkpoint is used).

No loss of accuracy in the solution, whereas interpolating the solution on the failed nodes from those that survive may result in increased errors.

In summary, according to preferred invention embodiments, the failover memory controller, which acts autonomously from the processing units within the system and is capable of accessing their memory, is the most important distinctive technical feature. The use of a battery or other auxiliary power supply to supply power to memory on nodes that have failed is also a distinctive technical feature.

The invention claimed is:

1. A method of recovering application data from a memory of a failed node in a computer system including a plurality of nodes connected by an interconnect and of writing the application data to a replacement node, the method comprising:

storing a most recent state of an application in a first node memory within a node, the node among the plurality of nodes of the computer system executing the application which creates application data, and the first node memory being controlled by a node memory controller within the node;

while the application is running and before failure of the node, the application registering a portion of node memory with the failover memory controller as either available or unavailable for use by the application in a second node memory of the replacement node;

controlling, upon failure of the node, the first node memory of the failed node using a failover memory controller that is provided separately from the failed node and acting autonomously of the failed node, the failover memory controller duplicating a function of the node memory controller after the node fails; and wherein, the failover memory controller copies the application data from the first node memory of the failed node to the second node memory of the replacement node over the interconnect.

2. A method according to claim 1, wherein the first node memory of the failed node is supplied with auxiliary power after the node failure, and an auxiliary power supply is controlled by the failover memory controller.

3. A method according to claim 2, wherein the auxiliary power supply is in a form of a battery provided with the failover memory controller.

4. A method according to claim 2, wherein the auxiliary power supply powers the failover memory controller before and after the node failure.

5. A method according to claim 2, wherein the auxiliary power supply powers a connection of the failover memory controller to the interconnect.

6. A method according to claim 2, wherein the auxiliary power is supplied directly to the first node memory, rather than via another component of the failed node.

7. A method according to claim 1, wherein the failover memory controller is directly joined to the interconnect, rather than via another component of the failed node.

8. A method according to claim 1, wherein a management process of the computer system monitors nodes, detects the node failure, identifies the replacement node and instructs the failover memory controller to copy the application data from the first node memory of the failed node to the second node memory of the replacement node.

9. A method according to claim 8, wherein the management process also restarts the application on the replacement node.

10. A method according to claim 1, wherein one of an auxiliary power supply and a failover memory controller are provided for each node, and for a group of nodes.

11. A hardware failover memory controller for use in recovery from a failed node when running an application on a computer system comprising a plurality of nodes, each having a memory within a node, and the memory being correspondingly controlled by a node memory controller within the node,
the plurality of nodes being connected by an interconnect, the failover memory controller being provided separately from the failed node and acting autonomously of the failed node, the failover memory controller duplicating a function of the node memory controller after the node fails;
wherein the failover memory controller is operable to connect to one of the memory controller and a memory of the failed node;
wherein the failover memory controller is operable to register a portion of memory as available or unavailable for use by the application in the memory of a replacement node; and
wherein the failover memory controller is arranged to control transfer of application data stored in the memory of the failed node over the interconnect to the memory of the replacement node.

12. A failover memory controller according to claim 11, wherein the failover memory controller is autonomous of the plurality of nodes in the computer system.

13. A computer system, comprising:
a plurality of hardware nodes, each having a node memory within a corresponding node controlled by a node memory controller within the corresponding node;
a hardware failover memory controller for use in recovery from a failed node when running an application on the plurality of nodes, the failover memory controller being provided separately from the failed node and acting autonomously of the failed node, the failover memory controller arranged to duplicate a function of the node memory controller after the node fails; and
a hardware interconnect, connecting the plurality of nodes and the failover memory controller,
wherein the failover memory controller is operable to connect to one of the memory controller and a memory of a failed node;
wherein the failover memory controller is operable to register a portion of memory as available or unavailable for use by the application in the memory of a replacement node; and
wherein the failover memory controller is arranged to control transfer of application data stored in the memory of the failed node over the interconnect to the memory of the replacement node.

14. A computer system according to claim 13, wherein a failover memory controller is provided for each node.

15. A computer system according to claim 13, wherein the failover memory controller has a power connection and interconnect connection separate from node power and interconnect connections.

* * * * *